Feb. 8, 1944.   N. ERLAND AF KLEEN   2,340,887
CONTROL MECHANISM FOR ABSORPTION REFRIGERATING APPARATUS
Filed Dec. 12, 1940   5 Sheets-Sheet 1

INVENTOR
NILS ERLAND AF KLEEN
BY C. P. Goepel.
ATTORNEY

Patented Feb. 8, 1944

2,340,887

UNITED STATES PATENT OFFICE 2,340,887

CONTROL MECHANISM FOR ABSORPTION REFRIGERATING APPARATUS

Nils Erland af Kleen, Stockholm, Sweden, assignor to Kleen Refrigerator, Inc., Hoboken, N. J., a corporation of Delaware Application December 12, 1940, Serial No. 369,780

22 Claims. (Cl. 62—5)

This invention relates to new and useful improvements in absorption refrigerating apparatus having one or more intermittently operating units and more particularly to a control device for regulating the heating and cooling of the boiler absorber of each unit.

In a refrigerating apparatus of this character, each unit has a boiler absorber containing solid absorbent material capable of absorbing a gaseous refrigerant during one period of the operation (absorbing) and of giving up such refrigerant during the other period (generating). For the generating period, the boiler absorber is heated by any suitable means to drive out the gaseous refrigerant therefrom and into the evaporator end of the unit where it is desired to maintain the lowest or refrigerating temperature, while for the absorption period the boiler absorber is cooled to permit the return thereinto of the refrigerant evaporated in the evaporator to be absorbed by the solid absorbent material. The operation of the unit from one phase to the other is controlled automatically by a thermostat switch device in thermal contact with the boiler absorber so that when the heat input to the boiler absorber for the generating period reaches a predetermined amount, the thermostat switch device automatically shuts off the heat and simultaneously opens a valve to permit the circulation of a cooling medium to cool the boiler absorber for the absorption period. When the amount of cooling reaches a predetermined value, the thermostat switch closes the valve to stop the circulation of the cooling medium and actuates the heating means to repeat the cycle.

The length of each complete cycle of operation of the unit, that is generating and absorption, is dependent upon the rate of heat input and the corresponding rate of cooling. The present invention provides an adjustable control device for selectively regulating the rate of heat input for the boiler absorber and the corresponding rate of cooling thereof to selectively vary the length of each complete cycle, thereby controlling the amount of refrigeration produced by the evaporator.

The invention consists also in the provision of a thermostat switch responsive to the temperature in the region to be cooled for automatically controlling the rate of heat input to the boiler absorber during the normal operation of the unit.

The invention consists further in absorption refrigerating apparatus of the intermittent type capable of operating under abnormal or extraordinary conditions of relatively short cycles to produce considerably lower degrees of cooling than refrigerating apparatus of this type heretofore known.

The invention consists also in the provision of means for increasing the efficiency of the primary condenser for the abnormal operating conditions of the refrigerating apparatus and for correspondingly increasing the efficiency or cooling capacity of the cooling system.

The invention consists further in absorption refrigerating apparatus of the intermittent type, wherein the rate of heat input for the generation phase and the corresponding rate of cooling for the absorption phase are automatically controlled by temperature conditions outside the region to be cooled.

The new and novel features of my invention will be hereinafter set forth, illustrated in the accompanying drawings, and more particularly pointed out in the appended claims.

Referring to the drawings in which numerals of like character designate similar parts throughout the several views.

Figures 1, 2:
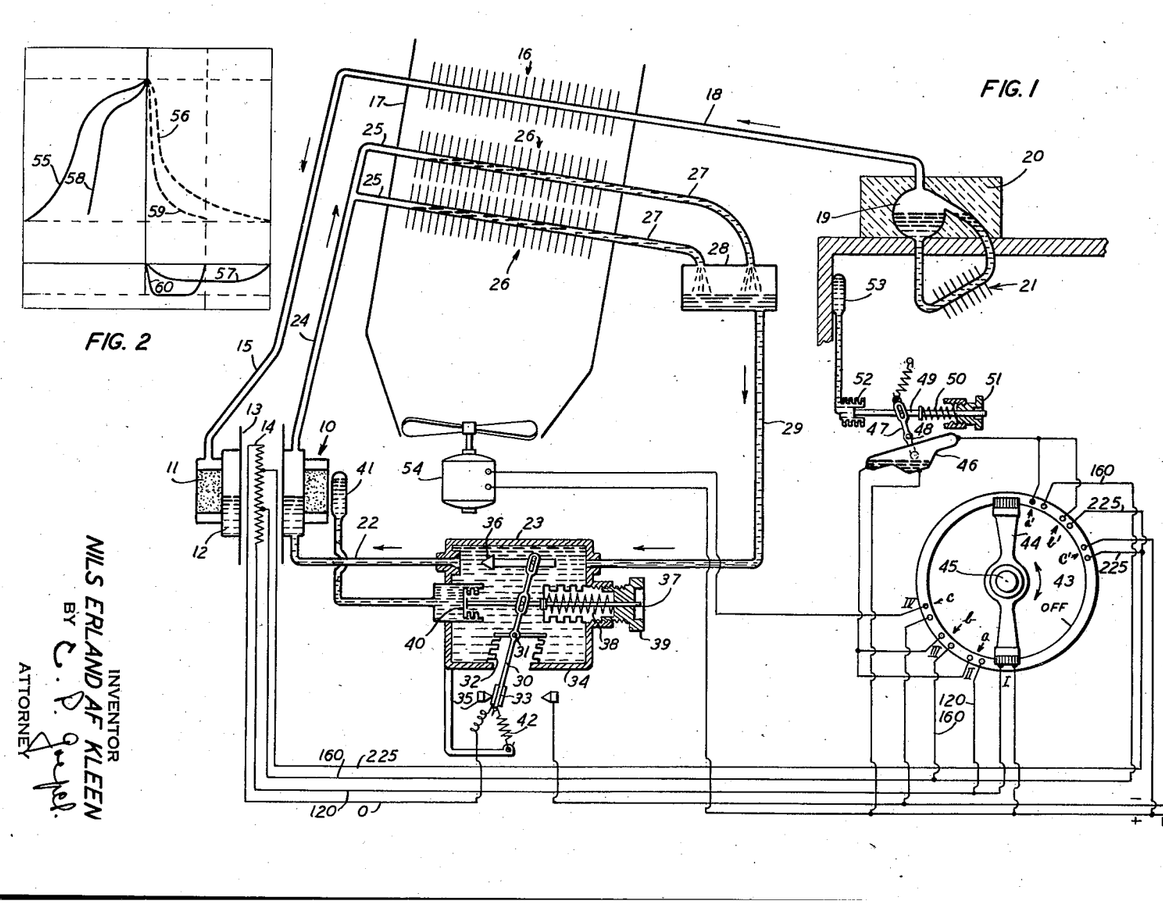
Fig. 1 is a diagrammatic view of a refrigerating apparatus having a single intermittently operating unit embodying a control device in accordance with my invention, certain parts of the apparatus being shown broken away and in section.
Fig. 2 is a time-temperature diagram of the operating conditions in the boiler absorber and evaporator of the unit shown in Fig. 1.

In the drawings, referring more particularly to Fig. 1, the unit therein illustrated comprises the usual boiler absorber 10 having an annular compartment containing solid absorbent material 11, an inner annular cooling jacket 12, and a central vertical flue 13 in which is disposed an electric heating cartridge 14. During the generating period, the gaseous refrigerant is driven out of the boiler absorber 10 and passes upwardly through outlet conduit 15 into a condenser 16 arranged in an air flue 17 where the refrigerant is condensed and flows through pipe 18 into an accumulator or collecting vessel 19 located in the upper portion of a refrigerator cabinet and preferably surrounded by insulating material 20. From the bottom of the accumulator 19 the liquid refrigerant flows through the evaporator 21 arranged adjacent the ice tray compartment of the refrigerator cabinet where it is desired to maintain the lowest temperature produced by evaporation of the refrigerant. The foregoing elements through which the gaseous refrigerant flows is generally known as the primary circulating system.

For the absorption period, the boiler absorber 10 is cooled by any suitable cooling device, that shown in the drawings comprising a secondary cooling system formed with the annular cooling jacket 12 through which system a cooling medium circulates. The cooling fluid enters the bottom of the jacket 12 through a conduit 22 leading from the valve chamber 23. From the jacket 12, the cooling medium passes upwardly through outlet pipe 24, having two branches 25 leading to a pair of secondary condensers 26 in the flue 17. After passing through condensers 26, the cooling medium flows through pipes 27 into a common collecting tank 28 and returns to the valve chamber 23 through pipe 29.

The operation of the unit is automatically switched over from one phase to the other by means of a thermostat switch device comprising vertical switch lever 30 fulcrumed as at 31 in the valve chamber 23. The lower end of switch lever 30 projects through a suitable opening in the bottom of the valve chamber sealed by a bellows diaphragm 32 and the free end of the switch lever carries an electrode 33 connected to one wire of a suitable source of electric current and adapted to cooperate on the one hand with a stationary electrode member 34 connected to the other wire of the source of electric current to energize the heat cartridge 14, and on the other hand, with an oppositely disposed abutment 35 so that upon rocking of the switch lever 30 from one position to the other, the heat cartridge 14 will be intermittently energized and de-energized. The opposite end of switch lever 30 extends upwardly in the valve chamber 23 and is connected at its extreme upper end to a reciprocatable valve 36 which cooperates with a valve seat to control the circulation of the cooling medium through conduit 22.

Intermediate its extreme upper end and its fulcrum 31, the switch lever 30 is suitably connected to a transverse rod 37 reciprocatable in the valve chamber 23 and normally urged to move in one direction by any suitable mechanism such, for example, as the coil spring 38 shown in the drawings whose loading pressure may be regulated by means of adjusting screw 39. Movement of the rod 37 in the opposite direction is brought about by a bellows diaphragm 40 connected to the transverse rod 37 and responsive to a fluid pressure system 41 in thermal contact with the boiler absorber 10.

Thus the spring 38 urges rod 37 in a direction to normally maintain valve 36 closed upon its seat and the electrode 33 in engagement with the complementary electrode 34 so that circulation of the cooling medium through the secondary system is prevented while heat cartridge 14 is energized to heat the boiler absorber 10. When the amount of heat input reaches a predetermined point, the pressure developed in the fluid system 41 rises sufficiently to overcome the loading pressure of the spring 38 and move transverse rod 37 against the spring 38, thereby rocking switch lever 30 on its fulcrum 31 to move electrode 33 onto abutment 35 to de-energize heat cartridge 14 while simultaneously opening valve 36 to permit circulation of the cooling medium through the secondary system. The lower end of switch lever 30 is preferably connected to a snap spring device 42 to insure shifting of the switch lever with a snap action, said spring yieldably maintaining the switch lever in either of its operating positions.

The heat cartridge 14 is adapted to heat the boiler absorber 10 at different rates of heat input so that the length of each generating period may be correspondingly varied. In accordance with the present invention, I have provided a control device generally indicated as 43 having a hand-operated arm 44 rotatable about a central axis 45 and adapted to selectively engage separate pairs of stationary contacts for different electrical circuits separately connected to the heat cartridge 14, whereby the latter may be energized to heat the boiler absorber 10 at different rates of heat input. The arm 44 of the control device 43 is adjustable from a position marked "Off" when the unit is not in operation, to four separate operating positions, marked "I," "II," "III" and "IV," respectively.

In order to clarify the showing of the four different circiuts to the heat cartridge 14, the four feed lines thereto have been marked by the wattage value thereof, namely 0, 120, 160 and 225. With the arm 44 of control device occupying the position "I" as shown in Fig. 1, after the boiler absorber 10 has been cooled and the pressure in the fluid pressure system 41 has dropped sufficiently to permit the loading pressure of spring 38 to overcome the same and move transverse rod 37 to the left, switch lever 30 will be rocked on its fulcrum 31 to shift valve 36 on to its seat and correspondingly move electrode 33 into engagement with the stationary electrode 34. The circuit to the heat cartridge 14 is thus completed by way of the negative or minus line so marked in the drawing and above referred to as the "0" feed line, and by way of the line designated as "120" which passes through the pair of contacts for position "I" on the control switch 43 to the plus or positive line of the current source.

The heat cartridge 14 is energized to heat the boiler absorber 10 at the minimum rate of heat input, namely, 120 watts, so that the period of heating will be relatively long before the pressure in fluid pressure system 41 rises sufficiently to rock the switch lever 30 back to the position shown in Fig. 1 to open valve 36 and disengage electrode 33 from electrode 34 to interrupt the circuit through line "0." The cooling medium of the secondary cooling system flowing through jacket 12 will cool the boiler absorber 10 at the same rate as that of the heat input so that each complete cycle of operation of the unit, that is, generating period plus absorption period, will occur at regular but comparatively long intervals. It will therefore be appreciated that the rate of refrigeration produced by evaporation of the refrigerant in the evaporator 21 will be quite slow and while possibly not enough to freeze water, it will be sufficient to keep a cool temperature in the refrigerator cabinet.

For the normal operation of the unit to produce a substantially uniform predetermined low temperature in the cabinet, the arm 44 is adjusted to position "II," or position "III," depending upon temperature conditions outside the cabinet. In position "II," one end of the arm 44 closes the circuit between a pair of contacts $a$ located on one side of the control device 43, and the other end of the arm 44 closes another circuit between a second pair of contacts $a'$ on the device 43 diametrically opposite contacts $a$. One of the contacts $a$ is electrically connected to line 120 and the other is in electrical connection with one side of a mercury switch 46 supported on the lower end of a rocking lever 47 fulcrumed as at 48. The upper end of lever 47 is operatively connected to a transverse rod 49 movable in one direction by means of a coil spring 50, the tension of which may be regulated by means of adjusting nut 51. Movement of the rod 49 in the opposite direction is controlled by a bellows diaphragm 52 responsive to a fluid pressure system 53 arranged in the refrigerator cabinet.

One of the contacts $a'$ is electrically connected to the opposite end of the mercury switch 46, while the other contact $a'$ is connected to line 160. A third electrical connection is made from the central portion of the mercury switch 46 to the positive line of the current source.

In this position of the arm 44, the heat cartridge 14 may be energized to heat the boiler absorber 10 either at the rate of 120 watts, or at the rate of 160 watts, depending upon the position of the mercury switch 46, to maintain a substantially uniform temperature in the refrigerator cabinet. In other words, as long as the cabinet temperature remains at a predetermined minimum, the spring 50 will overcome the pressure in the fluid pressure system 53 and the mercury switch 46 will be held in the position shown in Fig. 1. The heat cartridge 14 will therefore be energized to heat the boiler absorber 10 at the minimum rate of 120 watts by way of the circuit made by contacts $a$. However, should the temperature rise in the cabinet due to loading the cabinet or opening the door thereof, the pressure in pressure fluid system 53 will rise and operate bellows diaphragm 52 to move rod 49 against the loading pressure of spring 50 thereby rocking mercury switch 46 to its opposite position. The cartridge 14 will therefore be energized by way of contacts $a'$ closing the circuit to the 160 watt line and the boiler absorber 10 reheated more rapidly. As soon as the temperature drops to the predetermined minimum, the loading pressure of spring 50 will overcome the lowered pressure in the fluid pressure system 53 and rock mercury switch 46 back to the position shown in Fig. 1 so that heat cartridge will then be energized by the 120 watt line.

In order to maintain the predetermined normal temperature in the cabinet when the temperature outside the cabinet rises above a predetermined level, the arm 44 is rotated on the control device 43 to position "III" where one end of said arm closes a circuit between a pair of contacts $b$, and the other end of the arm 44 closes the circuit between a pair of contacts $b'$ diametrically opposite contacts $b$ on the control device 43. As in the case of contacts $a$ and $a'$, one of contacts $b$ is electrically connected to one end of the mercury switch 46 while one of the contacts $b'$ is similarly connected to the other end of the mercury switch. The other of contacts $b$ is connected to line 160 and the other contact $b'$ is connected to line 225 so that dependent upon the changes in temperature in the cabinet, as above pointed out for position "II," the boiler absorber 10 will be heated either at the minimum rate of 160 watts, or at the maximum rate of 225 watts.

In the operation of the unit for the three positions of the control device just described, the conventional secondary cooling system is usually sufficient to take care of the three different rates of cooling required corresponding to the different rates of heat input. However, in the event a sudden demand for refrigeration is required in the cabinet, for instance, when it is desired to make ice in a relatively short time, the length of each cycle must therefore be shortened, which means that the boiler absorber 10 must be heated for the generating period at a rapid rate and correspondingly cooled for the absorbing period at the same rate. In this event, the capacity of the secondary cooling system must be increased over and above its natural cooling efficiency as otherwise the length of the absorbing period would not coincide with that of the generating period. Moreover, inasmuch as the refrigerant is expelled from the boiler absorber 10 at such an increased rate during the generating periods when the unit is operating under abnormal conditions, the air cooled primary condenser 16 might not be able to condense all of the refrigerant prior to being delivered to the evaporator 21, and in order to insure proper condensation of the refrigerant, means must be provided for increasing the efficiency of this condenser.

In Fig. 1 I have shown one arrangement to increase the normal cooling efficiency of the secondary cooling system as well as that of the condenser 16 by means of electric fan 54 which is continuously energized when the arm 44 occupies position "IV" and one end of the arm engages contacts $c$ on the control device 43, one of which contacts leads from the positive of the current source and the other leads to the fan 54 connected to the negative of the current source. The other end of arm 44 closes contacts $c'$, one of which leads to the line 225 and the other to the positive line of the current source. In this position of the arm 44, the mercury switch 46 is inoperative to make and break separate circuits to the heat cartridge 14 for the reason that said cartridge is energized to heat only at one rate, namely, 225 watts.

In Fig. 2 I have shown a time-temperature chart to illustrate two complete cycles of the refrigerating unit described, solid line 55 representing the temperature rise in the boiler absorber 10 during the generating period for normal operating conditions of the unit when the arm 44 is in positions "II" or "III," while broken line 56 designates the corresponding temperature drop in the boiler absorber during the absorption period. The temperature in the evaporator 21 for this period is represented by solid line 57.

When the arm 44 is moved to position "IV," each cycle of the unit takes place in approximately one-half the time required for the "II" or "III" positions. The temperature rise in the boiler absorber 10 for this abnormal operating condition of the unit is indicated in Fig. 2 by solid line 58 and the corresponding temperature drop therein during the absorption period is indicated by broken line 59; the evaporator temperature is indicated by line 60 from which it will be observed that this temperature drops considerably lower than when the unit is operating in the "II" or "III" positions.

It will thus be seen from the foregoing description that I have provided an intermittent refrigerating unit capable of operating under variable conditions which may be regulated by simple hand adjustment of a control device to suit different temperature requirements in the refrigerator cabinet; also that for certain adjusted positions of the control device, the operating conditions of the refrigerating unit are automatically and selectively controlled by a thermostat-mercury switch arrangement to maintain a substantially uniform temperature in the cabinet.

It will also be observed that for the normal operating conditions of the unit, the usual air-cooled secondary system is sufficient to cool the boiler absorber for the various periods of absorption. However, for abnormal operating conditions of the unit when the boiler absorber is heated at a high rate, and consequently for shorter periods, the cooling capacity of the secondary system is increased to cool the boiler absorber in the relatively short time required for proper operation of the refrigerating unit.

Figure 3:
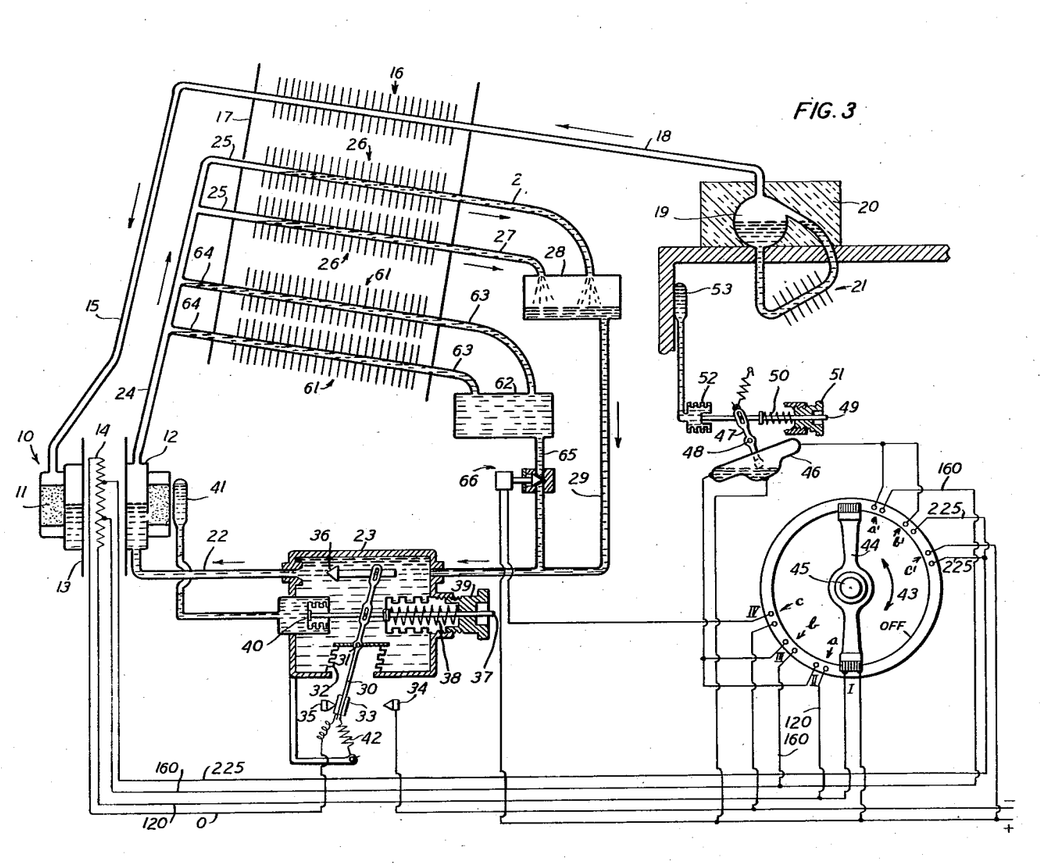
Fig. 3 is a diagrammatic view similar to Fig. 1 showing a modified form of the secondary cooling system.

The unit shown in Fig. 3 is similar to that just described in connection with Fig. 1, with the exception that the secondary system includes in addition to the secondary double condenser 26 and collecting tank 28, an auxiliary double condenser 61, disposed in the lower portion of the flue 17 and connected to an auxiliary collecting tank 62 similar to collecting tank 28, by means of pipes 63. The cooling medium enters auxiliary condenser 61 by way of branch conduits 64 leading from the outlet conduit 24. From the auxiliary collecting tank 62 the cooling medium flows through conduit 65 to the valve chamber 23. The conduit 65 is provided with an electrically operated valve generally indicated as 66 adapted to open when the arm 44 of control device 43 occupies position "IV" to close the two pairs of contacts c and c'.

Thus, during the normal operation of the unit, or when the arm 44 is rotated to any of the positions "I," "II" or "III," the valve 66 will remain closed so that only the cooling medium from collecting tank 26 will circulate through the secondary system to cool the boiler absorber 10 for each absorption period. However, when the unit is operating in position "IV," valve 66 will open to permit the cooling medium from auxiliary collecting tank 62 to supplement the amount of cooling medium in circulation during each absorption period to take care of the demand for rapid cooling.

Figure 4:
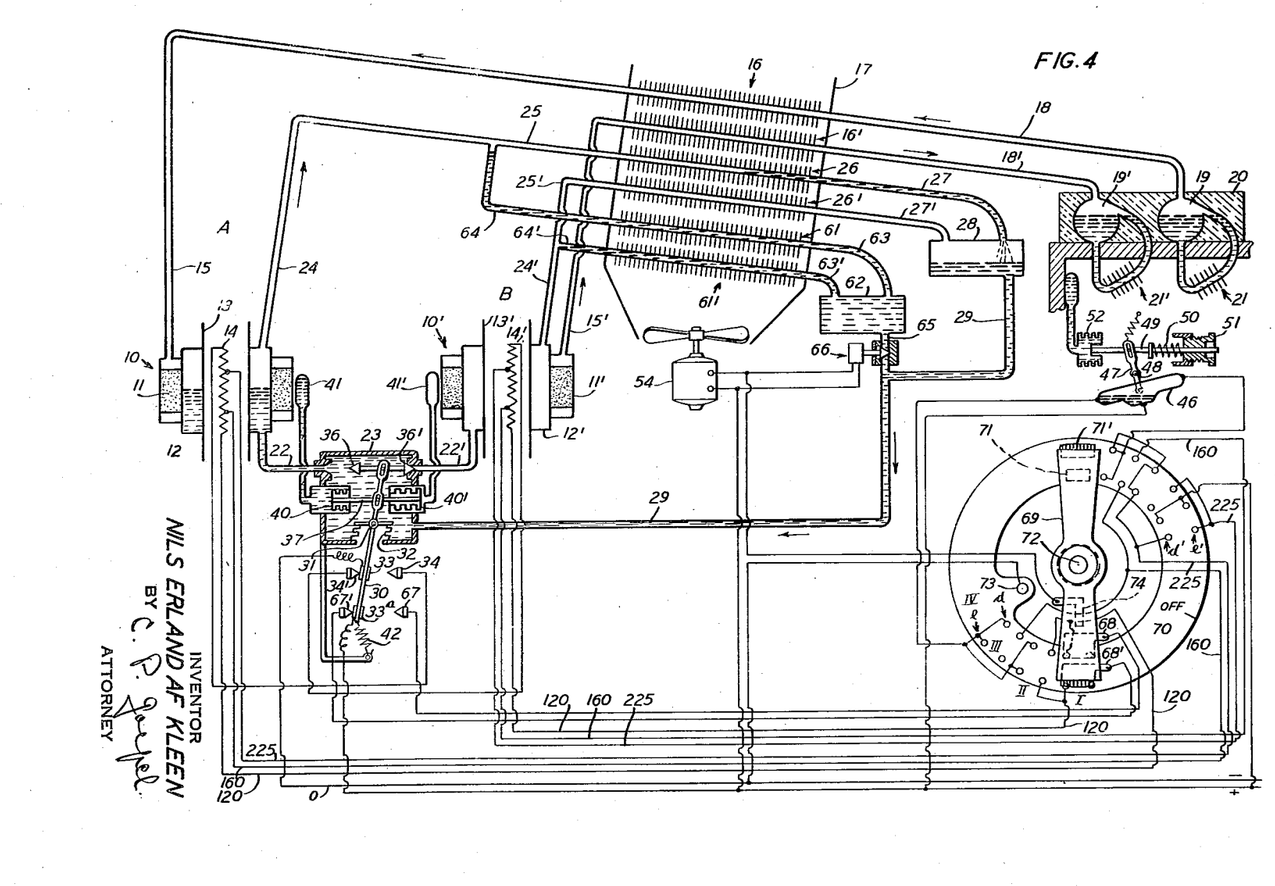
Fig. 4 is a diagrammatic view of a refrigerating apparatus showing my invention applied to two intermittently and alternately operating units.

Referring to Fig. 4, the apparatus illustrated consists of two intermittently and alternately operating units generally designated by A and B, respectively, each similar to the unit heretofore described in connection with Figs. 1 and 3. For convenience, the various parts of unit A have been designated by the same reference characters used in describing the previous figures, while the corresponding parts of unit B have been indicated by the prime of the numeral.

The operation of units A and B from one phase to the other is automatically controlled by a thermostat switch similar to that shown in Figs. 1 and 3 with the exception that the switch lever 30 is operatively connected at its upper end to a double valve arrangement 36, 36' controlling the circulation in the secondary system to the respective boiler absorber jackets 12, 12'. The switch lever 30 is movable in one direction by a bellows diaphragm 40 responsive to a fluid pressure system 41 in thermal contact with boiler absorber 10 of unit A, and is movable in the opposite direction by a similar bellows diaphragm 40' responsive to a fluid pressure system 41' in thermal contact with the boiler absorber 10' of unit B.

The lower end of the switch lever 30 carries electrode members 33 and 33a, the former being connected to the negative of the source of current, as in Figs. 1 and 3, and the latter being connected to the positive of the source of current. Electrode 33 is adapted to alternately engage one and disengage the other of a pair of stationary electrodes 34 and 34' oppositely disposed on each side of the switch lever 30. Electrode 34 is electrically connected to the heat cartridge 14, while the other electrode 34' is similarly connected to the heat cartridge 14', so that when the switch lever 30 is rocked on its fulcrum 31 from one operating position to the other, the movable electrode 33 will engage one of the stationary electrodes 34 or 34' to close the circuit to the corresponding heat cartridge and break the circuit to the other heat cartridge. Simultaneously with the making and breaking of these circuits, the double valve arrangement 36, 36' correspondingly closes one of the valves and opens the other.

Figures 5, 6:
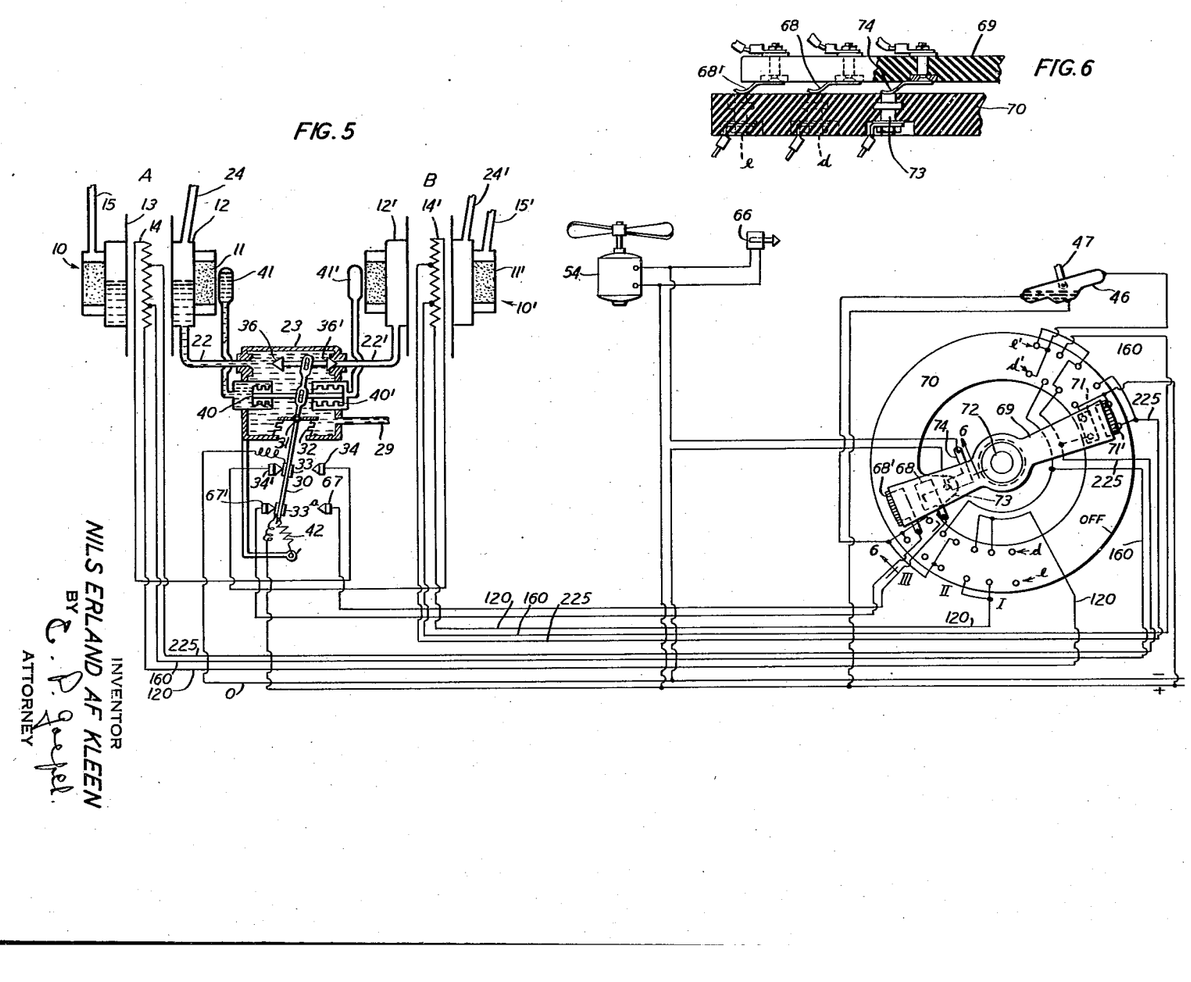
Fig. 5 is a diagrammatic view similar to Fig. 4 of the electrical system and control therefor.
Fig. 6 is a fragmentary sectional detail of the control device taken on line 6—6 of Fig. 5.

The movable electrode 33a cooperates with a second pair of stationary electrodes 67 and 67' also disposed on opposite sides of the switch lever 30 and electrically connected to separate contact-making brushes 68 and 68' on the underside of one end of the rotatable arm 69 mounted on a control device 70 (Fig. 6). The opposite end of the arm 69 is also provided on its under side with separate contact-making brushes 71, 71' which, together with the brushes 68, 68' are adapted to regulate the length of each cycle of operation of the two units A and B. The arm 69 is rotatable about a central axis 72 and is adjustable from a position marked "Off" on the control device 70, to four operating positions, "I," "II," "III" and "IV."

For positions "I," "II" and "III" of the arm 69, the control device 70 has an inner row d of three separate pairs of contacts adapted to be engaged selectively by the brush 68, and an outer concentrically arranged row e of three separate pairs of contacts adapted to be engaged by the brush 68'. For position "IV," the control device has a single contact member 73 disposed radially inwardly of the inner row d and adapted to be engaged by a brush 74 mounted on the underside of the arm 69 adjacent the brush 68 as clearly shown in Fig. 6. Diametrically opposite the pairs of contacts for positions "II" and "III," and diametrically opposite the contact 73 for position "IV," the control device 70 is also provided with an inner row d' of three separate pairs of contacts adapted to be engaged by the brush 71, and an outer row e' of three separate pairs of contacts adapted to be engaged by the brush 71'.

In position "I," one of the pair of contacts in the inner row d is connected to the feed line 120 of the heat cartridge 14, while one of the pair of contacts in the outer row e is connected to a feed line 120 of the other heat cartridge 14'. Thus with the parts occupying the position shown in Fig. 4, electrodes 33 and 33a carried by the switch lever 30 are in engagement with electrodes 34' and 67' and the circuit to the heat cartridge 14' is therefore completed through the pair of contacts in the inner row e to heat the boiler absorber 10' at the rate of 120 watts for the generating period of unit B. During this period, the unit A is absorbing, valve 36 being open to permit circulation in the secondary cooling system through boiler absorber jacket 12 by way of pipe 22, outlet 24, branch 25, secondary condenser 26, pipe 27, collecting tank 28, and return pipe 29 to the valve chamber 23.

When the switch lever 30 is automatically shifted to its opposite position in the manner hereinabove explained, the operation of the units is reversed, unit A operating in the generating phase and unit B operating in the absorption phase. The circuit to the heat cartridge 14 is completed through the pair of contacts in the inner row d, and the electrodes 33 and 33a on switch lever 30 in engagement with the electrodes 34 and 37, respectively, to heat the boiler absorber 10 at the rate of 120 watts.

When the control arm 69 is rotated to position "II," the mercury switch 46 automatically controls the rate of heat input to the boiler absorbers 10 and 10' at either a minimum of 120 watts, or at a maximum of 160 watts. For this position, one of each of the contacts in the inner and outer rows d and e, respectively, is connected to one end of the mercury switch 46, while the other of each of said pairs of contacts is connected to separate feed lines 120 leading to the corresponding heat cartridges 14 and 14'. One of each of the pair of contacts in the inner and outer rows d' and e' is connected to the opposite end of the mercury switch 46, while the other of each of said pairs is connected to the two feed lines 160 of the heat cartridges 14 and 14', respectively. The operation of the units A and B in this position of the control arm 69 is believed obvious without further explanation, it being understood that the mercury switch 46 will automatically regulate the rate of heating of the heat cartridges 14 and 14' between the minimum of 120 watts and the maximum of 160 watts, depending upon temperature conditions in the refrigerator cabinet.

For position "III" on the control device 70, the mercury switch 46 is again operative to automatically control the rate of energization of the heat cartridges 14 and 14' either at the minimum of 160 watts, or at the maximum of 225 watts, dependent upon the temperature variations in the cabinet. One of each of the pair of contacts in both the inner and outer rows d and e, is connected to one side of the mercury switch 46, while the other of each of said pairs is connected to separate feed lines 160 to the heat cartridges 14 and 14', respectively. One of each of the diametrically opposite pairs of contacts in the inner and outer rows d' and e', is connected to the other side of the mercury switch 46, and the other of each of said pairs of said contacts is connected to separate feed lines 225 to the corresponding heat cartridges.

Referring to Fig. 5, the control arm 69 is shown occupying position "IV" with the contact 74 thereon engaging contact 73 on the control device 70 to close the circuit to the electric fan 54 as well as to the valve 66 so that in this operating position, the fan is continuously energized and valve 66 is held in open position to permit the cooling fluid from auxiliary tank 62 to circulate with that from tank 28 to cool the boiler absorbers 10 and 10' during their respective periods. The circuits to the heat cartridges 14 and 14' are made by way of the pairs of contacts in the inner and outer rows d' and e', one contact of each of said pairs being connected to the corresponding feed lines 225 to the respective cartridges, and the other contact of each of said pairs being connected to the positive line of the current source. Thus, the units A and B operate at abnormal conditions of relatively short cycles, one unit being heated at a rapid rate of heat input while the other unit simultaneously is being cooled at the corresponding rate.

While I have shown threaded nut 39 in Figs. 1 and 3 for manually regulating the loading pressure of spring 38 for the transverse rod 37 to compensate for different room temperature conditions, such loading pressure may be regulated automatically by any suitable means such, for example, as a thermostat arrangement responsive to temperature conditions outside the refrigerator cabinet.

Figures 7, 8:
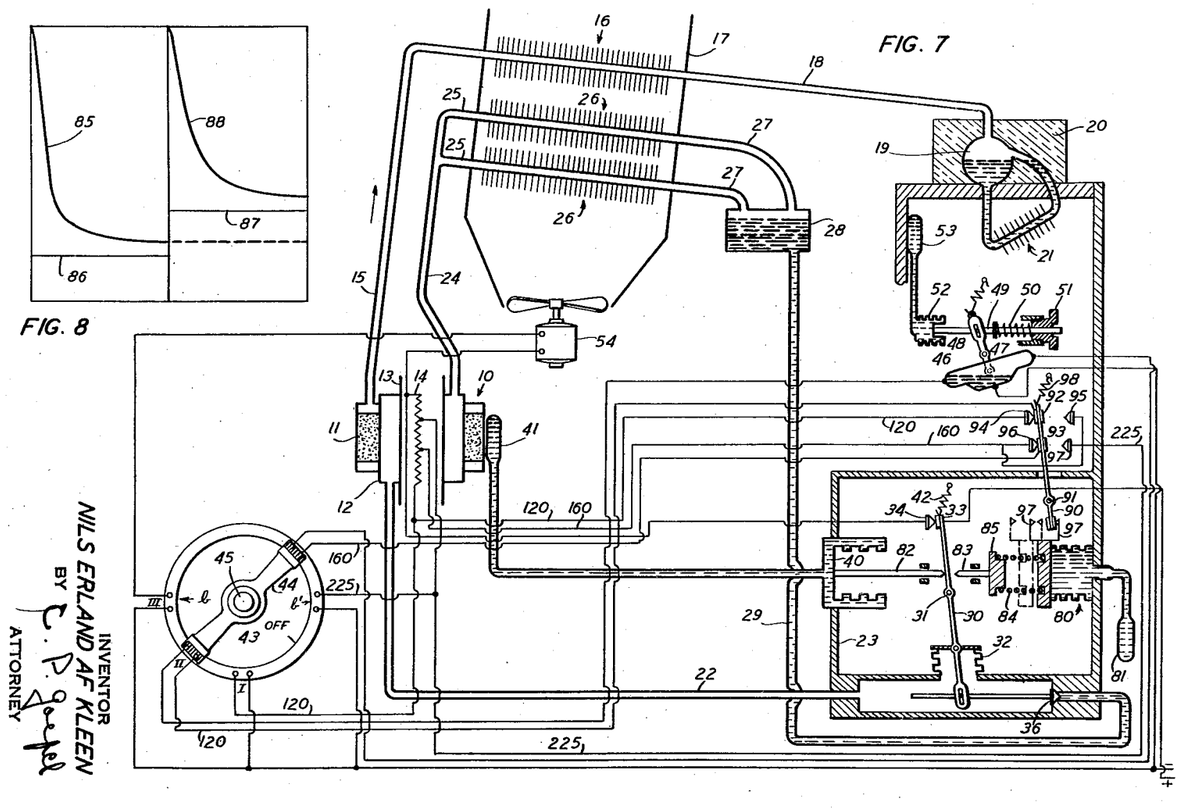
Fig. 7 is a diagrammatic view similar to Fig. 1, showing one form of thermostat arrangement for automatically controlling the operation of a single intermittent unit upon variations in temperature conditions outside the cabinet.
Fig. 8 is a comparative time-temperature chart of the operating conditions in the boiler absorber during the absorption period for two different temperature conditions outside the refrigerator cabinet.

One form of such thermostat arrangement is illustrated in Fig. 7 and consists of a bellows diaphragm 80 responsive to a fluid pressure system 81 sensitive to temperature conditions outside the cabinet. For convenience in illustrating the various parts of the unit, the valve 36 is shown arranged in the lower portion of the valve chamber 23 and is operatively connected to the lower end of the switch lever 30 while the electrode member 33 is carried by the upper end of the lever instead of the arrangement shown in Fig. 1. However, in place of the transverse rod 37 operatively connected to the switch lever 30 to rock the latter on its fulcrum 31 from one operating position to the other, I provide separate transverse rods 82 and 83, one on each side of the switch lever 30, rod 82 being movable by the bellows diaphragm 40 responsive to the fluid pressure system 41 in thermal contact with the boiler absorber 10, and rod 83 being movable by a coil spring 84 interposed between the abutment 83a on the rod 83 and the diaphragm 80. It will thus be seen that upon variations in room temperature, the fluid pressure system 81 will either move bellows diaphragm 80 in one direction to increase the loading pressure of spring 84, or permit movement of the bellows diaphragm 80 in the opposite direction to decrease the loading pressure of the spring.

Referring to the chart shown in Fig. 8, line 85 represents the temperature in the boiler absorber 10 during the absorption period when the temperature outside the refrigerator cabinet is at a predetermined low level indicated by line 86. For this outside temperature level, the arm 44 of the control device 43 is adjusted to position "II" and the bellows diaphragm 80 occupies the position shown in full lines in Fig. 7. The loading pressure of spring 84 is therefore relatively small to permit the boiler absorber 10 to be cooled sufficiently low before rocking switch lever 30 to start the generating period of the unit.

When the temperature outside the cabinet rises to the level indicated by line 87 in Fig. 8, the fluid pressure system 81 will move bellows diaphragm 80 to the position indicated by dotted lines in Fig. 7 to increase the loading pressure of the spring 84. For this temperature, the arm 44 is adjusted to position "III" and the boiler absorber temperature during each absorbing period then follows line 88 in Fig. 8.

It will be seen from the foregoing that I have provided a refrigerating apparatus having a single intermittent unit whose operation from one phase to the other is automatically controlled by a thermostat switch that is in turn automatically adjusted according to room temperatures.

Movement of the bellows diaphragm 80 from one position to the other can also be used to automatically regulate the rate of heat input to the boiler absorber by any suitable mechanism, such for example, as switch lever 90 fulcrumed as at 91. One end of the lever 90 is provided with a pair of electrode members 92 and 93, the former being connected to one of the contacts $a$ for position "II," for example, of the control device 43, and the latter being connected to one of the contacts $a'$. Electrode member 92 is adapted to cooperate for one position of the switch lever 90 with a complementary stationary electrode 94 connected to the feed line 120 of the cartridge 14, and for the other position of the switch lever 90, electrode member 92 cooperates with a complementary stationary electrode 95 connected to the feed line 160 of the cartridge.

Similarly, for one position of the switch lever 90, electrode 93 cooperates with a complementary stationary electrode 96 connected to feed line 160 of the heat cartridge, and for the other position of the switch lever, electrode 93 cooperates with a complementary stationary electrode 97 connected to feed line 225 of the cartridge. The lower end of the switch lever 90 lies between spaced arms 97 carried by the bellows diaphragm 80. As in the case of switch lever 30, a snap spring 98 yieldably maintains the switch lever 99 in either of its extreme operating positions.

With the parts of this auxiliary control occupying the position shown in Fig. 7, the heat cartridge 14 will be energized during each generating period of the refrigerating unit at the rate of either 120 watts, or 160 watts, dependent upon the position of the mercury switch 46 according to the temperature conditions in the cabinet. However, should the temperature outside the cabinet rise to the point where bellows diaphragm 80 is moved to the dotted line position, thereby rocking lever 90 on its fulcrum 91 to the opposite position, electrodes 92 and 93 will then engage complementary electrodes 95 and 97, respectively, and the heat cartridge 14 will then be energized at the rate of either 160 watts, or 225 watts, depending upon the temperature conditions in the cabinet.

Thus, with the use of this auxiliary control arrangement, the rate of heating of the boiler absorber for a given position of the control device 43, is automatically adjusted to a different position of the control device without manual adjustment of the arm 44. It will be understood that while I have shown and described this auxiliary control in connection with a single unit, the same is equally applicable to the double unit shown in Fig. 4.

Although I have shown the boiler absorber of each unit heated by electrical means, the same may be heated by any other means such, for example, as gas burners and the like, in which event the control device 43 will operate different gas jets to regulate the rate of heat input. Furthermore, instead of being operable only when the control arm 44 occupies position "IV" on the control device 43, the circuit to the fan 54 may be so arranged that said fan will be energized whenever the boiler absorber 10 is heated at the rate of 225 watts.

While I have described the invention in connection with absorption refrigerating apparatus, the same is equally applicable to adsorption refrigerating systems and it will be understood therefore that the use of the term "absorption" in the specification as well as in the claims, is intended to include also "adsorption."

From the foregoing it is believed that the construction, operation and advantages of my invention may be readily understood by those skilled in the art without further description, it being borne in mind that numerous changes may be made in the details disclosed without departing from the spirit of the invention as set out in the following claims.

What I claim and desire to secure by Letters Patent is:

1. In absorption refrigerating apparatus of the intermittent type producing low temperature at a predetermined region, said refrigerating apparatus including a boiler-absorber, the combination with heating means for the generating period of operation of said apparatus, cooling means for the absorption period of operation thereof, and thermostat mechanism responsive to the temperature in said boiler-absorber for selectively controlling said heating means and said cooling means to shift the operation of the apparatus from one period to the other; of a control device adjustable to different positions for controlling the rate of heating of said heating means and the corresponding rate of cooling of said cooling means, a thermostat device responsive to the temperature of said predetermined region for regulating the rate of heating of said heating means and the corresponding rate of cooling of said cooling means for certain positions of said control device, from a predetermined minimum to a predetermined maximum, and a separate thermostat device responsive to the temperature outside said region, for automatically adjusting the rate of heating of said heating means and the corresponding rate of cooling of said cooling means from one position of said control device to another.

2. In intermittent absorption refrigerating apparatus having combined generating and absorbing means and operating to cool a compartment, the combination with heating means for said combined generating and absorbing means, cooling means for said combined generating and absorbing means, and thermostat mechanism for controlling said heating means and said cooling means; of a control device adjustable to different positions for controlling the rate of heating of said heating means and the corresponding rate of cooling of said cooling means, means responsive to the temperature in the compartment being cooled for regulating the rate of heating of said heating means between a predetermined minimum and a predetermined maximum for certain positions of said control device, and means responsive to the temperature outside the said compartment for varying the rate of heating of said heating means from that corresponding to one position of said control device to that corresponding to another position of said control device independently of the latter.

3. In absorption refrigerating apparatus of the intermittent type having two units operating in phase relation to one another to produce substantially continuous refrigeration in a common cooling compartment, each unit having a boiler-absorber, the combination of: heating means for said boiler absorbers for the generating phase operation of each unit, cooling means for said boiler-absorbers for the absorption phase operation of each unit, a control device adjustable to different positions for controlling different rates of heating of said heating means and the corresponding different rates of cooling of said cooling means, a thermostat device responsive to the temperature in said boiler-absorbers for selectively controlling said heating means and said cooling means to shift the operation of the respective units from one phase to the other, and thermostat means responsive to the temperature in said cooling compartment and operative for certain positions of said control device to regulate the rate of heat input to said boiler-absorbers between a predetermined minimum and a predetermined maximum.

4. In absorption refrigerating apparatus of the intermittent type having two units operating in phase relationship to produce substantially continuous refrigeration in an enclosed space, each unit having a boiler-absorber adapted to be heated for the generating phase operation, and cooled for the absorption phase operation, and thermostat mechanism responsive to the temperature in said boiler-absorbers for shifting the operation of said units from one phase to the other to complete the cycle of operation of the respective units; the combination of a control device including means adjustable to different positions to regulate the rate of heat input and the corresponding rate of cooling during the generating and absorption phase operations, respectively, of each unit, and thermostat means responsive to the temperature in the space being cooled for regulating the heat input between a predetermined minimum and a predetermined maximum.

5. In absorption refrigerating apparatus of the intermittent type including a boiler absorber, a condenser, and an evaporator, all coupled together to form a closed primary circulating system for a refrigerant, said boiler absorber containing absorbent material capable of absorbing refrigerant vapors during the absorption period and of giving up such refrigerant vapors during the generating period; means for heating said boiler absorber selectively at different rates of heat input, comprising an electrical cartridge having separate feed lines of correspondingly different electrical values, means adjustable to different positions, certain of said positions closing two separate circuits through two of said feed lines, whereby said heat cartridge may be energized at a predetermined maximum and a predetermined minimum, a thermostat device responsive to the temperature adjacent said evaporator for selectively controlling said separate circuits for said certain positions of said adjustable means, and means connected to said feed line of highest value to increase the efficiency of said primary condenser when said cartridge is energized at the predetermined maximum.

6. In refrigerating apparatus of the intermittent absorption type operating to cool an enclosed space and including combined generating and absorbing means, the combination with heating means and cooling means for said combined generating and absorbing means, and thermostat mechanism responsive to the temperature in said combined generating and absorbing means for selectively controlling the heating and cooling of the latter; of adjustable means for controlling the rate of heating and the corresponding rate of cooling of said heating means and cooling means, respectively, said adjustable means including thermostat means responsive to the temperature in said space being cooled for regulating the rate of heating of said heating means between a predetermined minimum and a predetermined maximum.

7. In refrigerating apparatus of the intermittent absorption type operating to cool an enclosed space and including combined generating and absorbing means, the combination with heating means and cooling means for said combined generating and absorbing means, and thermostat mechanism responsive to the temperature in said combined generating and absorbing means for selectively controlling the heating and cooling of the latter; of an adjustable control device for adjusting the rate of heating and the corresponding rate of cooling of said heating means and cooling means, respectively, for different operating conditions, and thermostat means responsive to the temperature in said space being cooled for regulating the rate of heating of said heating means between a predetermined minimum and a predetermined maximum for certain operating conditions determined by said adjustable control device.

8. In refrigerating apparatus of the intermittent absorption type operating to cool an enclosed space and including combined generating and absorbing means, the combination with heating means and cooling means for said combined generating and absorbing means, and thermostat mechanism responsive to the temperature in said combined generating and absorbing means for selectively controlling the heating and cooling of the latter; of an adjustable control device movable to different positions for adjusting the rate of heating and the corresponding rate of cooling of said heating means and said cooling means, respectively, for different operating conditions, thermostat means responsive to the temperature in the space being cooled for regulating the rate of heating of said heating means between a predetermined minimum and a predetermined maximum, for certain operating conditions, and separate thermostat means responsive to the temperature outside the said space being cooled, for automatically varying the value of said predetermined minimum and predetermined maximum.

9. In absorption refrigerating apparatus of the intermittent type operating to cool an enclosed space and including combined generating and absorbing means, heating means and cooling means for said generating and absorbing means, and a thermostat mechanism responsive to the temperature in said combined generating and absorbing means for selectively controlling the heating and cooling of the latter; the combination of thermostat means responsive to the temperature in the space being cooled for regulating the rate of heating of said heating means between a variable minimum and a variable maximum, and separate thermostat means responsive to the temperature outside the space being cooled for determining the value of said variable minimum and maximum rates regulated by said first named thermostat means.

10. In absorption refrigerating apparatus, in combination, a plurality of intermittent units operating in phase relationship for producing substantially continuous refrigeration in an enclosed space, each unit having a boiler-absorber, heating means and cooling means for said boiler-absorbers, a thermostat control responsive to the temperature in said boiler-absorbers for selectively controlling the heating and cooling thereof to thereby control the operation of each unit from one phase to the other and vice versa, means for adjusting the rate of heating of said heating means and the corresponding rate of cooling of said cooling means for different operating conditions of said units, and thermostat means responsive to the temperature in the space being cooled and operative for certain operating conditions determined by said adjusting means for regulating the rate of heating of said heating means between a predetermined minimum and a predetermined maximum.

11. In refrigerating apparatus of the intermittent absorption type including a plurality of units operating in phase relationship to produce substantially continuous refrigeration in an enclosed space, each unit having a boiler-absorber, the combination of heating means and cooling means for said boiler-absorbers, thermostat mechanism responsive to the temperature in said boiler-absorbers for selectively controlling the heating and cooling of the latter to thereby control the operation of each unit from one phase to the other and vice versa, thermostat means responsive to the temperature in the space being cooled for regulating the rate of heating of said heating means between a predetermined minimum and a predetermined maximum, and means for varying the value of said predetermined minimum and predetermined maximum rates regulated by said thermostat means.

12. In intermittent absorption refrigerating apparatus operable to cool an enclosed space and having combined generating and absorbing means adapted to be heated during the generating periods and cooled during the absorbing periods of the apparatus, heating means and cooling means for said combined generating and absorbing means, the combination of thermostat means responsive to the temperature in said combined generating and absorbing means for selectively controlling the heating and cooling of the latter, separate thermostat means responsive to the temperature in the space being cooled for regulating the rate of heat input to said combined generating and absorbing means, and means for adjusting the standard of regulation of said second named thermostat means.

13. In intermittent absorption refrigerating apparatus operable to cool an enclosed space and having combined generating and absorbing means adapted to be heated during the generating periods and cooled during the absorbing periods of the apparatus, heating means and cooling means for said combined generating and absorbing means, the combination of thermostat means responsive to the temperature in said combined generating and absorbing means for selectively controlling the heating and cooling of the latter, separate thermostat means responsive to the temperature in the space being cooled for regulating the rate of heat input to said combined generating and absorbing means, and an adjustable master control for said first named and second named thermostat means.

14. In intermittent absorption refrigerating apparatus operable to cool an enclosed space and having combined generating and absorbing means adapted to be heated during the generating periods and cooled during the absorbing periods of the apparatus, heating means and cooling means for said combined generating and absorbing means, the combination of thermostat means responsive to the temperature in said combined generating and absorbing means for selectively controlling the heating and cooling of the latter, separate thermostat means responsive to the temperature in the space being cooled for regulating the rate of heat input to said combined generating and absorbing means, and an adjustable master control for regulating the rate of heating of said heating means and the corresponding rate of cooling of said cooling means for controlling the operating conditions of said refrigerating apparatus.

15. In intermittent absorption refrigerating apparatus operable to cool an enclosed space and having combined generating and absorbing means adapted to be heated during the generating periods and cooled during the absorbing periods of the apparatus, heating means and cooling means for said combined generating and absorbing means, the combination of thermostat means responsive to the temperature in said combined generating and absorbing means for selectively controlling the heating and cooling of the latter, separate thermostat means responsive to the temperature in the space being cooled for regulating the rate of heat input to said combined generating and absorbing means, an adjustable master control for regulating the rate of heating of said heating means and the corresponding rate of cooling of said cooling means for controlling the operating conditions of said refrigerating apparatus, and thermostat means responsive to the temperature outside the space being cooled for automatically adjusting the standard of regulation of said second named thermostat means for a predetermined setting of said master control.

16. In refrigerating apparatus of the intermittent absorption type operating to cool an enclosed space and including a boiler-absorber adapted to be heated during the generating periods and cooled during the absorbing periods of the refrigerating apparatus; the combination of a thermostat control including means responsive to the temperature in said boiler-absorber and operating to terminate the heating and initiate the cooling of said boiler-absorber at a predetermined temperature attained in the latter during the generating period of the apparatus and to initiate the heating and terminate the cooling of said boiler-absorber at a predetermined minimum temperature attained in the latter during the absorbing period of the apparatus, and means responsive to the temperature outside the space being cooled for varying the operating standard of said first named temperature responsive means directly in accordance with ambient air temperature variations.

17. In refrigerating apparatus of the intermittent absorption type operating to cool an enclosed space and including a boiler-absorber; the combination of heating means for said boiler-absorber, and control mechanism for said heating means including means responsive to the temperature in said boiler-absorber for terminating the heat supply at a predetermined temperature attained in said boiler-absorber during the generating phase operation of the refrigerating apparatus and for initiating the heat supply at a predetermined temperature attained in said boiler-absorber during the absorbing phase operation of the refrigerating apparatus, and means responsive to the temperature outside the space being cooled for varying the operating standard of said first named temperature responsive means directly in accordance with variations in ambient air temperature.

18. In refrigerating apparatus of the intermittent absorption type operating to cool an enclosed space and including a boiler-absorber; the combination of heating means for said boiler-absorber, and control mechanism for said heating means including means responsive to the temperature in said boiler-absorber for terminating the heat supply at a predetermined temperature attained in said boiler-absorber during the generating phase operation of the refrigerating apparatus and for initiating the heat supply at a predetermined temperature attained in said boiler-absorber during the absorbing phase operation of the refrigerating apparatus, means responsive to the temperature outside the space being cooled for varying the operating standard of said first named temperature responsive means directly in accordance with variations in ambient air temperature, and means responsive to the temperature in the space being cooled for varying the heat supply between a predetermined minimum and a predetermined maximum.

19. In refrigerating apparatus of the intermittent absorption type operating to cool an enclosed space and including a boiler-absorber and means for heating said boiler-absorber intermittently; the combination of cooling means for said boiler-absorber, and control mechanism for said cooling means including means responsive to the temperature in said boiler-absorber to initiate the cooling at a predetermined temperature attained in said boiler-absorber during the heating period and to terminate the cooling at a predetermined temperature attained in said boiler-absorber during the cooling period, and means responsive to the temperature outside the space being cooled for varying the operating standard of said first named temperature responsive means directly in accordance with variations in ambient air temperature.

20. In refrigerating apparatus of the intermittent absorption type operating to cool an enclosed space and including combined generating and absorbing means adapted to be heated during the generating periods and cooled during the absorbing periods of the refrigerating apparatus, and means for heating said combined generating and absorbing means intermittently; the combination of an air cooled heat transfer system formed by a plurality of interconnected elements for the circulation of the heat transferring fluid in heat exchange relation with said combined generating and absorbing means to cool the latter, valve means controlling the flow of the heat transferring fluid in said system, means responsive to the temperature in said combined generating and absorbing means to open said valve means at a predetermined temperature attained in said combined generating and absorbing means during the heating period and to close said valve means at a predetermined temperature attained in said combined generating and absorbing means during the cooling period, and means responsive to the temperature outside the space being cooled for varying the operating standard of said first named temperature responsive means in accordance with ambient air temperature variations.

21. In refrigerating apparatus of the intermittent absorption type operating to cool an enclosed space and including combined generating and absorbing means adapted to be heated during the generating periods and cooled during the absorbing periods of the refrigerating apparatus; the combination of heating means and cooling means for said combined generating and absorbing means, and a control mechanism including pressure operated control means for said heating means and cooling means, a pressure creating fluid system responsive to the temperature in said combined generating and absorbing means and operating at a predetermined temperature attained in the latter during the generating period to move said control means in one direction to render said heating means ineffective to supply heat and simultaneously to render said cooling means effective to cool said combined generating and absorbing means, a spring loading device to move said control means in the opposite direction against the pressure of said pressure creating fluid system and operating at a predetermined pressure attained in said pressure creating fluid system corresponding to a predetermined temperature attained in said combined generating and absorbing means during the absorbing period to render said cooling means ineffective to cool and simultaneously to render said heating means effective to heat said combined generating and absorbing means, and means responsive to the temperature outside the space being cooled for varying the loading pressure of said spring loading device against said pressure creating fluid system directly in accordance with variations in ambient air temperature.

22. In refrigerating apparatus of the intermittent absorption type operating to cool a thermally insulated storage space and including combined generating and absorbing means; the combination of heating means for said combined generating and absorbing means, and control mechanism including means controlling the operation of said heating means to heat said combined generating and absorbing means intermittently, means movable to a plurality of operating positions to adjust the rate of heating of said heating means for different operating conditions of the refrigerating apparatus, and means responsive to the temperature in the space being cooled to increase and decrease the rate of heat input to said combined generating and absorbing means for a predetermined setting of said second-named means.

NILS ERLAND AF KLEEN.